UNITED STATES PATENT OFFICE.

HANNS JOHN, OF PRAGUE, CZECHOSLOVAKIA.

MANUFACTURE OF ALDEHYDE CONDENSATION PRODUCT CAPABLE OF TECHNICAL UTILIZATION.

1,355,834. Specification of Letters Patent. Patented Oct. 19, 1920.

No Drawing. Application filed October 25, 1919. Serial No. 333,377.

*To all whom it may concern:*

Be it known that I, HANNS JOHN, magister of pharmacy, a citizen of the Czechoslovakian Republic, residing at Prague, Manesgasse, Czechoslovakia, have invented certain new and useful Improvements in Manufacture of Aldehyde Condensatiton Products Capable of Technical Utilization, of which the following is a specification.

My invention relates to the manufacture of products obtained by condensation of an aliphatic aldehyde, preferably of formic aldehyde, with carbamid (urea) or thiocarbamid or other carbamid derivatives, they being substantially equivalent.

The action of formic aldehyde on urea has been studied by various chemists. C. Goldschmidt, for instance, has caused formic aldehyde to act upon urea in the presence of potassium hydroxid. By this reaction he obtained an amorphous substance which readily disengaged formic aldehyde, and which he assumed to be dimethylolcarbamid.

All the products obtained up to the present by condensation of formic aldehyde with carbamid, were of no technical value or could not be used for industrial purposes, owing to their physical and chemical properties.

Now I have found that by carrying out the reaction between formic aldehyde and carbamid or its derivatives in a special manner, it is possible to produce different substances fit for a variety of technical applications.

By causing the condensation to take place either in the presence of alkali or other condensing mediums or making the starting substances to react upon each other at a low temperature during a more or less long time, the prior authors only obtained products such as the dimethylolcarbamid mentioned above, whereas by the process according to my invention substances are produced which were up to now unknown, and which are quite distinct from dimethylolcarbamid.

I have found that, in order to obtain condensation products fit for industrial applications, the raction is to be carried out without addition of condensing agents and at a higher temperature. According to the quantities of formic aldehyde and of carbamid present, as well as according to the duration and height of heating applied, products of very different nature are obtained.

If the ingredients are caused to react only during a comparatively short period, the product of condensation is still soluble in water. This solution is highly adhesive and, when dried, leaves the condensation product in the shape of a perfectly colorless product which is transparent like glass and insoluble in all inert solvents.

In this stage therefore a glue is produced which sticks in a cold state to all objects, of preference with smooth surfaces such as glass, metals, etc. The substance may also, besides other applications, be used for filling root-canals in dental surgery, or as a lacquer which can be directly laid on without addition of spirituous or such like solvents. This colorless and brilliant lacquer may be mixed with any organic or mineral pigments. Furthermore, it may advantageously be utilized for impregnating materials or fabrics of any kind, especially for covering the supporting planes of flying-machines, and such like.

If, from the beginning, the ingredients are brought together on such conditions that the process will be achieved only in a longer time than stated above, the resultant product of condensation will be still fluid in a heated state, but it will gelatinize when being cooled. In this way prepared, the product forms a colorless, transparent, tensile and elastic mass, insoluble in water as well as in alcoholic solvents, and which is acted upon only by acids or alkali liquors. This mass can be used as a substitute for india-rubber or such like.

The substance produced in the manner described, is moreover eapable of being hardened. This hardening process is carried out most advantageously by heating the product up to say 80° C. According to the duration of the hardening process, the final products show different properties. The main advantage is that also the hardened product is colorless and transparent, as well as rather resistant to chemical agents, that it is readily to be worked and possesses a sufficient degree of elasticity.

When strongly heated, the substance is carbonized, but does not flare up.

The reagent substances may be used in various proportions as shown the following examples of carrying out the process under notice:

1. 5 parts of a commercial solution of (say 40 per cent.) formic aldehyde, and 1 part of carbamid are heated in a distilling vessel or still. When an adequate proportion of the liquid is distilled off, the glue-like mass as described above, is obtained.

2. 6 parts of a commercial solution of formic aldehyde and 1 part of carbamid are heated in a distilling vessel until nearly half the liquid has been distilled off. After cooling the gelatinous product described above, is obtained.

3. The substance obtained in accordance with example 2, is heated up to about 80° C. during such a period until it has attained the desired degree of hardness.

The carbamid mentioned in Examples 1 and 2, can be replaced by thiocarbamid.

Furthermore, by heating other derivatives of carbamid with formic aldehyde in the manner described, products of like or similar nature and properties are obtained.

4. 5 parts of a commercial (say 40 per cent.) solution of formic aldehyde and 1 part of acetylcarbamid are heated in the manner stated above. The resultant substance is colorless and liquid in a heated state, but sets when cooling, to form a white corny mass.

The acetylcarbamid cited in Example 4, can be replaced by benzoylcarbamid.

The different products as described may be used, according to their special properties, as a glue, lacquer, impregnating material or as a substitute for rubber, ebonite, celluloid, corn or for other industrial purposes.

What I claim and desire to secure by Letters Patent of the United States is:

1. The process of manufacturing condensation products capable of technical utilization which comprises reacting with an aliphatic aldehyde upon substances containing carbonic acid amids, in a highly heated state, without adding any condensing medium.

2. The process of manufacturing condensation products capable of technical utilization which comprises reacting with formic aldehyde upon carbamid at the temperature of distillation without adding any condensing medium.

3. The process of manufacturing condensation products capable of technical utilization which comprises reacting with formic aldehyde upon thiocarbamid in a heated state, without adding any condensing medium.

4. The process of manufacturing condensation products capable of technical utilization which comprises reacting with formic aldehyde upon acidulated carbamid in a heated state, without adding any condensing medium.

5. The process of manufacturing condensation products capable of technical utilization which comprises reacting with formic aldehyde upon acidulated thiocarbamic in a heated state, without adding any condensing medium.

6. The process of manufacturing condensation products capable of technical utilization which comprises reacting with an aqueous solution of formic aldehyde upon substances containing carbonic acid amid, the components being present in a ratio of about 5 parts to 1 part, and heating the fluid during a comparatively short period.

7. The new product obtained by reacting with an aqueous solution of formic aldehyde upon substances containing carbonic acid amid, the components being present in a ratio of about 5 parts to 1 part, and heating the fluid only a comparatively short time, which product is a glue-like mass, leaving, when dried, a colorless sheet transparent like glass and insoluble in all inert solvents, and which is applicable for sticking objects of any material, preferably with smooth surfaces, as well as for lacquering, varnishing or impregnating purposes.

8. The process of manufacturing condensation products capable of technical utilization which comprises reacting with an aqueous solution of formic aldehyde upon substances containing carbonic acid amid, the components being present in a ratio of not to exceed 6 parts to 1 part, and heating the mass until about half the reacting liquid is removed.

9. The process of manufacturing condensation products capable of technical utilization which comprises reacting with an aqueous solution of formic aldehyde upon substances containing carbonic acid amid, the components being present in a ratio of not to exceed 6 parts to 1 part, heating the mass until about half the reacting liquid is removed, and submitting the resultant product to a hardening process, preferably by heating it for some time at a temperature of about 80 degrees centigrade.

10. The new product obtained by reacting with an aqueous solution of formic aldehyde upon substances containing carbonic acid amid, the components being present in a ratio of not to exceed 6 parts to 1 part, and heating until about half the reacting liquid is removed, which product, still in a heated state, is fluid, but, when cooled, forms a tensile and elastic material, insoluble in all inert solvents, and applicable as a substitute for india-rubber or, after being subjected to a hardening process, for ebonite, corn, celluloid and the like.

In testimony whereof I affix my signature in presence of two witnesses.

HANNS JOHN.

Witnesses:
 STEPAU HAAS,
 CORÉNE KOLER.